Oct. 11, 1960 J. K. PATTERSON 2,955,625
STRUT SERVICING APPARATUS
Filed Jan. 7, 1959 6 Sheets-Sheet 1

John K. Patterson
INVENTOR.

Oct. 11, 1960  J. K. PATTERSON  2,955,625
STRUT SERVICING APPARATUS
Filed Jan. 7, 1959   6 Sheets-Sheet 2

Fig. 2

John K. Patterson
INVENTOR.

Oct. 11, 1960 J. K. PATTERSON 2,955,625
STRUT SERVICING APPARATUS
Filed Jan. 7, 1959 6 Sheets-Sheet 4

John K. Patterson
INVENTOR.

Oct. 11, 1960

J. K. PATTERSON 2,955,625

STRUT SERVICING APPARATUS

Filed Jan. 7, 1959

John K. Patterson
INVENTOR.

United States Patent Office 2,955,625
Patented Oct. 11, 1960

2,955,625

STRUT SERVICING APPARATUS

John K. Patterson, 502 Adamson Ave., Carrollton, Ga.

Filed Jan. 7, 1959, Ser. No. 785,455

18 Claims. (Cl. 141—49)

This invention relates to apparatus for serving hydraulic equipment.

Although the principles of the invention are applicable for the serving of aircraft struts, there are numerous other applications of the invention. Hydraulic cylinders used for shock absorbing and other purposes are common, and the apparatus herein may be used for serving such hydraulic cylinders, especially in those instances where it is important that the hydraulic cylinders be predictable in their operation.

An object of the invention is to provide a versatile hydraulic equipment servicing tool for all of the struts of any presently manufactured airplanes or to service other equipment hydraulic systems, for example the hydraulic cylinders used in missile launching pads or in the docks at coastal or inland shipping ports. The invention makes it considerably easier to service such hydraulic equipment and as a result of servicing with a tool constructed in accordance with the invention, the hydraulic cylinders are accurately and correctly charged with hydraulic fluid.

Although it is usually thought that air and hydraulic fluid in hydraulic equipment is improper, the servicing tool herein makes use of high pressure air as well as hydraulic fluid under considerable pressure to service hydraulic cylinders. Of course, the air under pressure and the hydraulic fluid under pressure must be properly used by the servicing apparatus in order to achieve the desired results of correct servicing of conventional hydraulic cylinders.

As indicated previously, the servicing apparatus described herein is capable of being used with numerous types of hydraulic equipment. However, the greatest demand at the present time seems to be for servicing apparatus for the main struts and outrigger struts in comparatively large airplanes. Therefore the ensuing description will deal principally with the more complicated operations of servicing main and outrigger struts of airplanes. Slightly different techniques are suggested for different types of airplanes, although the principles of the invention remain the same for each airplane and in fact, for each type of hydraulic equipment that is serviced with the servicing apparatus described herein.

In connection with the servicing of aircraft struts, it has been shown conclusively by numerous tests than an amazing number of manhours are saved by using the strut servicing apparatus described herein. Ordinarily for a large airplane well over 100 manhours are required to service the main struts and the outrigger struts. This manhour requirement is reduced to only 3 or 4 hours by using the servicing apparatus described herein. Furthermore, the strut servicing apparatus does a much better job.

Another object of the invention is to provide a hydraulic equipment servicing apparatus which is compact and considering the task which it performs, the apparatus is basically simple in construction and easy to use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary elevational view of an airplane showing conventional main oleo struts being serviced by the apparatus of this invention.

Figure 16 is a diagrammatic elevational view of a missile launching pad having hydraulic struts.

Figure 17 is an elevational view of one of the struts in Figure 16, parts being broken away in section, Figures 16 and 17 showing that the strut servicing apparatus may be used not only in connection with airplanes but with struts used in connection with other vehicles, devices, equipment or the like.

Figure 9:
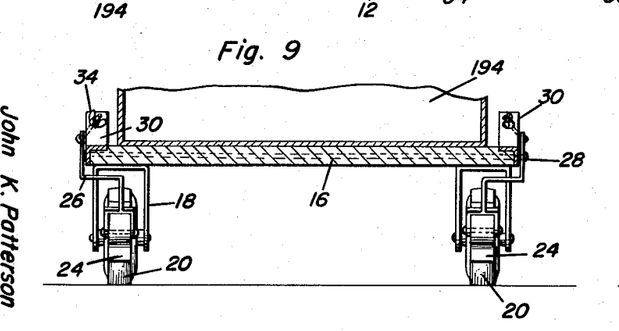
Figure 9 is a fragmentary cross-sectional view showing principally the brakes on the cart of the servicing apparatus.
Figure 10:
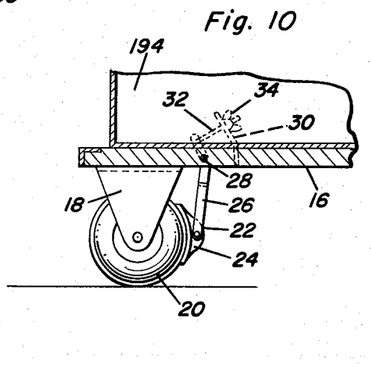
Figure 10 is a sectional view showing one of the brakes on a wheel of the cart.

Reference is first made to Figures 1, 3–5, 9 and 10. These figures show strut servicing apparatus 10 mounted on a portable cart 12. Everything necessary for the servicing of struts is carried by the cart so that it may be wheeled easily to the airplane 14 or to any other location so that the strut servicing operation may be conveniently performed. Cart 12 has a base 16 provided with four wheel hangers 18 which support wheels 20. One or more, preferably two of the wheels 20 have brakes 22 connected with them so that the cart may be locked at one place. One of the simplest forms of brake apparatus is shown in Figures 9 and 10. A brake shoe 24 is connected to a forked arm 26 with the brake shoe adapted to contact the tread of the tire on wheel 20. A pivot 28 is carried by bracket 30 which is secured to the base 16 of the cart. There are means connected with arm 26 to pivotally actuate the arm, for instance an I-bolt 32 with a wing nut 34 therein. The I-bolt extends through an opening in the base supported bracket 30. By tightening the wing nut 34 the arm 26 is made to move in such direction as to bring the brake shoe 24 tightly against the tread of the tire on wheel 20 (Figure 10). It is understood that the brakes may be individually operative as shown in Figure 9 or the brakes of both wheels may be operated in unison by merely extending a linkage between arms 26.

Figure 3:
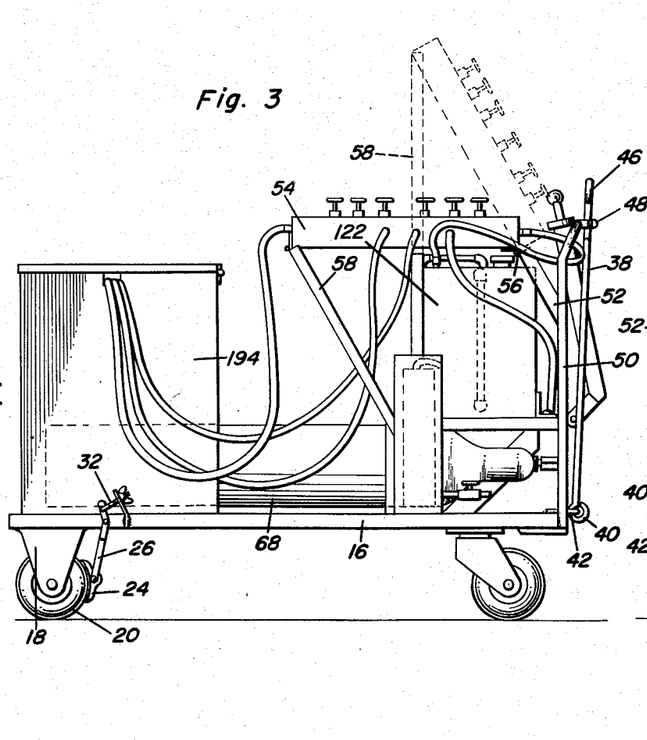
Figure 3 is a side elevational view of the apparatus.
Figure 4:
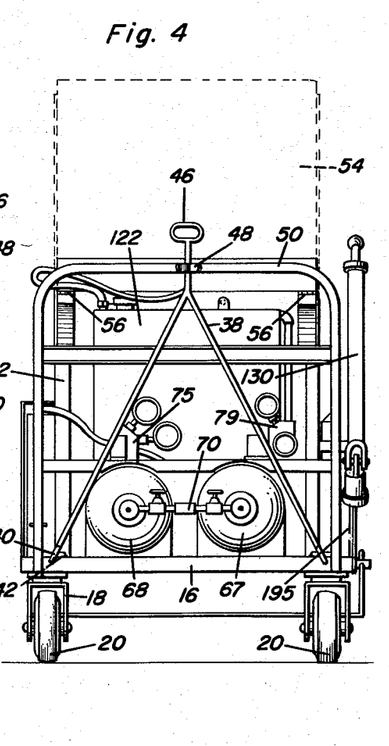
Figure 4 is an end elevational view of the apparatus.
Figure 5:
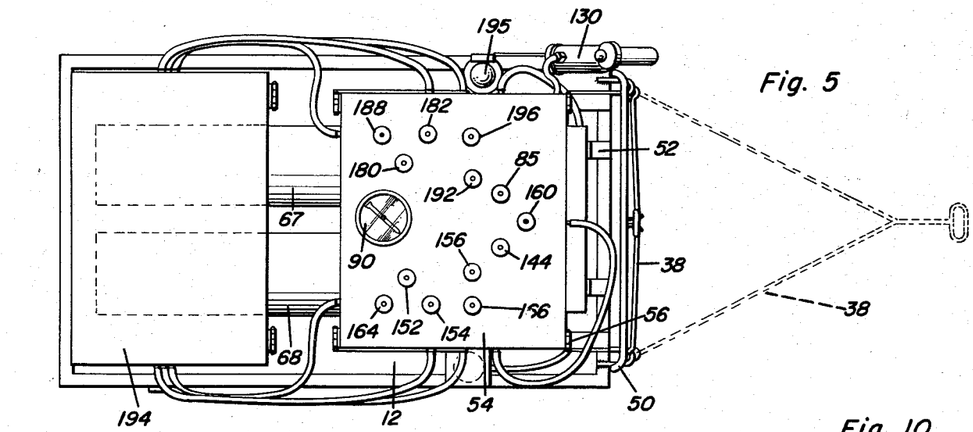
Figure 5 is a top view of the apparatus.

A drawbar 38 is connected by pivots 40 at the lower diverged end thereof to brackets 42 at the forward end of the cart base 16. A handle 46 is at the outer extremity of the drawbar, and there is a spring clamp 48 carried by hand rail 50 and within which to separably fasten the drawbar in an upright position. Hand rail 50 is essentially U-shaped and is attached at its lower end to base 16 (Figures 3 and 4). There is an upstanding framework 52 secured to the base 16, and a console valve panel 54 is connected by hinges 56 to the upper end thereof. In this way the panel 54 may be elevated and held in an elevated position by brace 58 which engages a part of the panel and which abuts a convenient part of framework 52. It is to be clearly understood that the only purpose in having the panel 52 capable of being moved from a horizontal position to an elevated angular position is for convenience of operation. Should it be desirable and in fact, to reduce the complication of construction it is even preferable to have the console panel 54 in a fixed position which may be either horizontal, since the cart is not very high with respect to the height of an average man, or in an inclined position.

Figure 2:
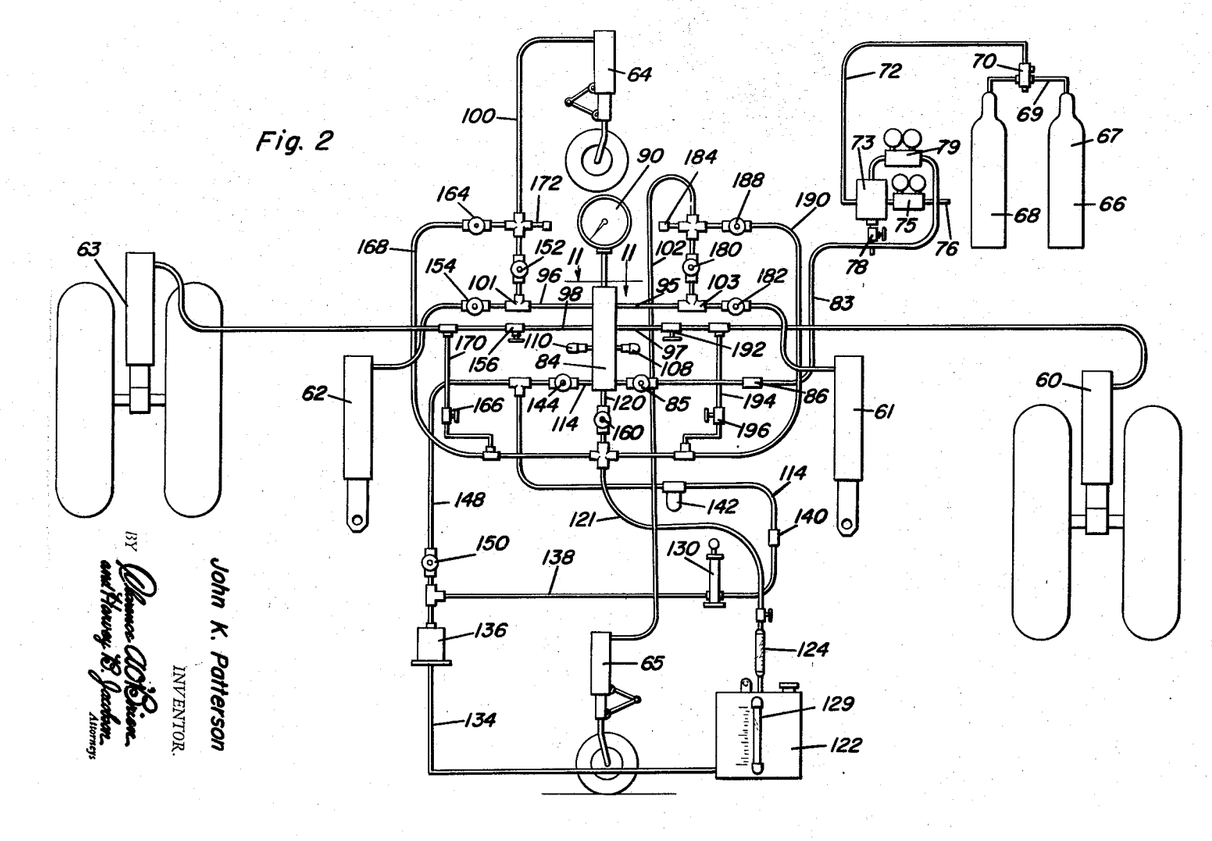
Figure 2 is a diagrammatic view showing the air and hydraulic flow circuits together with four main struts and two outrigger struts of an airplane as they would be connected with the apparatus when the airplane struts are being serviced.
Figure 14:
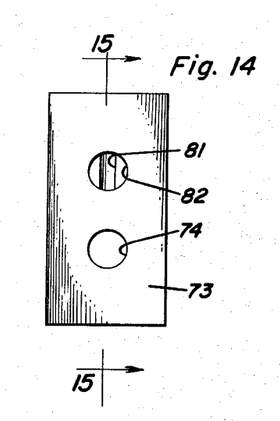
Figure 14 is an elevational view of a distribution block connected at the air supply on the cart of the apparatus.
Figure 15:
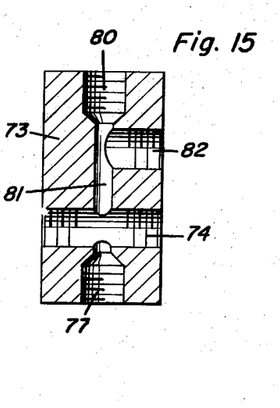
Figure 15 is a sectional view taken on the line 15—15 of Figure 14.

There are other structures and devices carried by the cart 12, but these enter indirectly into the equipment actually used for servicing the struts. Therefore, the remainder of the equipment on the cart shall be described in conjunction with Figure 2. There are four main struts 60, 61, 62 and 63 and two outrigger struts 64 and 65. Main struts 60 and 63 are shown with two of the wheels on each, and for simplicity, no wheels are illustrated as part of struts 61 and 62. It is understood that the struts 60, 61, 62, 63, 64 and 65, though, are the conventional struts of an airplane, for instance, airplane 14 or any other airplane having struts. The remainder of the structure shown in Figure 2 is carried by cart 12. Starting first with the air supply 66, two tanks 67 and 68 are coupled by an equalizer line 69. One tank containing air under pressure is a stand-by, while the other is used as the main air pressure supply. The equalizer line 69 is connected to a distributor block 70 having right angular connected passageways therein. The conventional valves on the tanks 67 and 68 are not shown. An air supply line 72 extends from the distributor block 70 and is connected with a second air distributor block 73 shown in detail in Figures 14 and 15. Block 73 has a transverse through passage 74 to which line 72 is connected and to which the line of a high pressure air regulator 75 is secured. The high pressure air regulator 75 has a line 76 leading from it and adapted to be connected with any part of the airplane air system to charge the same. Line 76, provided with a valve (not shown) furnishes a supply of air under tank pressure as controlled by regulator 75 for general application. Discharge passage 77 is connected with passage 74 (Figure 15) and has a water drain line controlled by valve 78 attached thereto. A low pressure regulator 79 (Figure 2) is connected by a pipe line to passage 80 in distributor block 73, the passage 80 having a reduced diameter part 81 which is in registry with passage 74. An auxiliary, ordinarily plugged port 82 is connected with the reduced diameter part 81 of passage 80.

Figures 11, 12, 13:
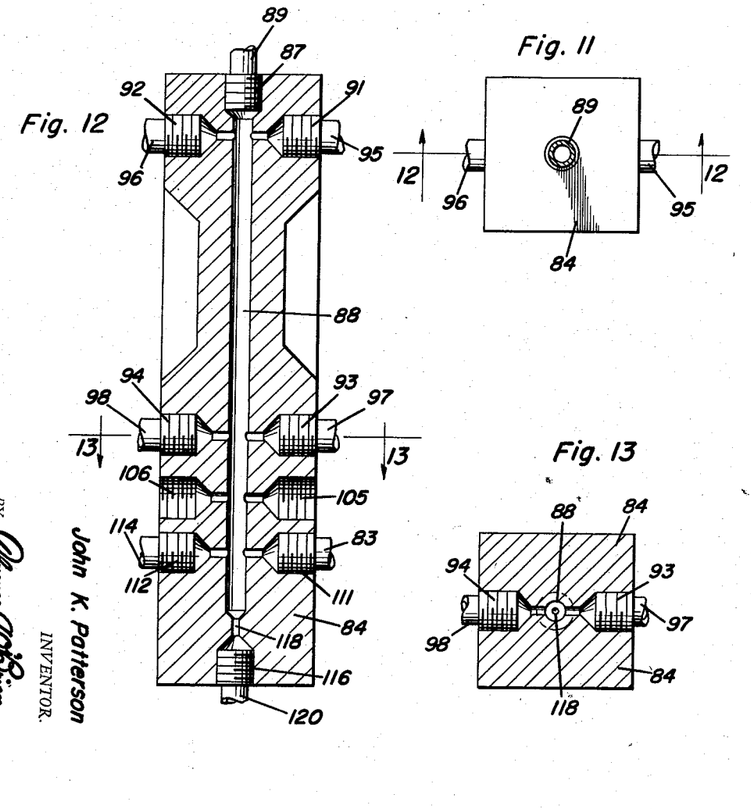
Figure 11 is an enlarged sectional view taken on the line 11—11 of Figure 2.
Figure 12 is a sectional view taken on the line 12—12 of Figure 11.
Figure 13 is a sectional view taken on the line 13—13 of Figure 12.

The low pressure regulator 79 has a pressure line 83 connected with it and connected with a specially designed hydraulic fluid and air distribution block 84 which is shown in detail in Figures 11–13. Air valve 85 is in line 83, and there is a check valve 86 between regulator 79 and air valve 85. Distributor block 84 channels the air under pressure from the source and through regulator 79 to the struts of the airplane. Struts 60 and 61 are considered to the right mains while struts 62 and 63 are considered to be the left mains. Strut 64 is arbitrarily considered the left outrigger and strut 65 is considered to be the right outrigger. The distribution block 84 has ten ports registered with a single longitudinal passageway 88 extending completely through the block 84. The upper part 87 has a gauge line 89 connected to it, and a pressure gauge 90 is attached to the gauge line 89. The next four ports 91, 92 and 93, 94 are for the four main strut lines 95, 96 and 97, 98. Main strut line 95 extends from port 91 to strut 61, while main strut line 96 extends from port 92 to the inboard left main strut 62. Strut line 97 extends from port 93 to the right outboard main strut 60, and main strut line 98 extends from port 94 to the left outboard main strut 63. The left outrigger strut 64 has a line 100 connected thereto and connected with line 96, for example, by T-fitting 101. Line 102 extends from the right outrigger 65 to line 95, the connection being made in any suitable manner, for example by a T-fitting 103.

Ports 105 and 106, connected with passageway 88, have adjustable pressure safety valves 108 and 110 connected with them, and ports 111 and 112 have the lines 83 and 114 connected therewith. Line 83 is the main air supply line, and line 114 is the main hydraulic fluid pressure supply line. The final port 116 in distributor block 84, is connected to the passageway 88 by a restrictor 118, and it has main drain line 120 connected therewith. This drain line is for hydraulic fluid, returning the same to tank 122 (Figure 2) through a sight glass 124. In aircraft applications the struts are provided with Schrader valves which must be opened so that the lines (Figure 5) connected with each oleo strut may be operatively attached. In fact, in most applications of hydraulic struts whether it is for aircraft or not, Schrader valves or valves that serve the same function as a Schrader valve, is ordinarily provided. The above described structure is all that is required for actual connection to the aircraft struts. The remainder of the structure which will be described subsequently, is manipulated properly for servicing of the struts.

The hydraulic system is composed of a hand pump 130 which delivers hydraulic fluid under pressure through pressure line 114 to port 112. The hydraulic fluid is drawn from tank 122 that has a sight glass 129 on the side thereof and through line 134 having a filter 136 therein. Pump inlet line 138 is connected to line 134 at a place where the hydraulic fluid is accepted after filter 136. Assuming a 10,000 p.s.i. hand pump 130, and an apparatus to service existing aircraft, there is a 3,000 p.s.i. check valve 140 in the main hydraulic fluid pressure line 114, the latter having a filter 142 therein and a main hydraulic control valve 144 in advance of port 112. An alternate line 148 is connected with line 114 in advance of the main hydraulic valve 144, and has a valve 150 therein at its connection with a hydraulic inlet line 138. Consider now the valves on the left side of the main distribution block 84 in Figure 2. There is a left outrigger valve 152 in line 100, and a main strut valve 154 in line 96. A main strut valve 156 is in line 98 for the main strut 63. Bleed pressure valve 160 is in line 120 and is connected to line 121, the latter identified as a part of line 120 which has sight glass 124 therein and which connects to tank 122. Bleed valves 164 and 166 are connected in lines 168 and 170 respectively. Bleed valve 164 is for outrigger 64 and therefore line 168 is connected with line 100, and there is a pressure safety valve 172 at the juncture of lines 68 and 100. Bleed valve 166 is for struts 62 and 63 and therefore, it is connected in line 170 that is attached in line 98 and in line 168, the latter connecting to line 121 for return to tank 122.

Referring now to the right side of the distribution block 84 in Figure 2, the arrangement is the same. Outrigger pressure valve 180 is connected in line 102, and line 102 is connected to pressure line 95 between distributor block 84 and the main pressure valve 182 for strut 61. A low pressure relief valve 184 is connected in line 102 between valve 180 and the outrigger 65. Bleed valve 188 is connected in a bleed line 190, the latter attached to line 102 and to line 121 and responding in function to line 168. The main pressure valve 192 for the main strut 60 is connected in line 97 and between the juncture of bleed line 194 with line 97 and the distributor block 84. Bleed line 194 has bleed valve 196 therein between its ends which are respectively connected to line 97 and line 190 to return to the common drain line 121.

Figure 6:
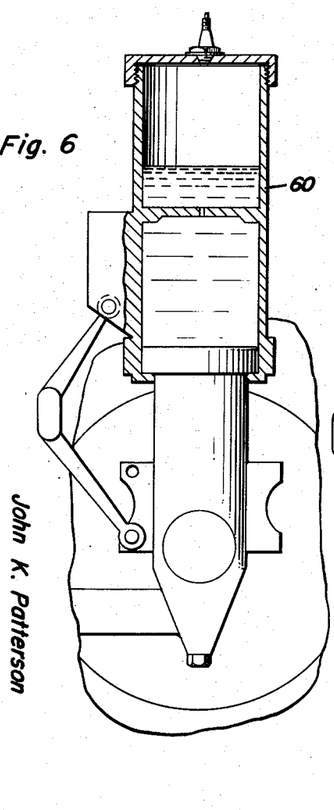
Figure 6 is a diagrammatic view, parts being shown in section of a conventional strut being serviced.
Figure 7:
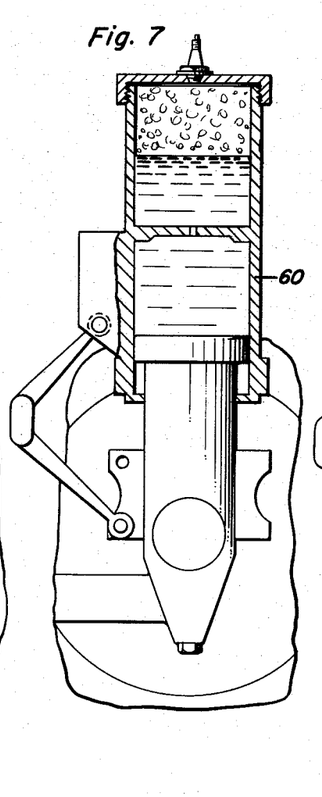
Figure 7 is a view similar to Figure 6 but showing the same strut in another stage of servicing.

Considering now the servicing of an airplane having only two struts, for example struts 60 and 63. After connection of lines 97 and 98 therewith, assuming all valves to be closed, the procedure is commenced. In fact, the servicing of strut 60 is the same as the servicing of strut 63 and so let it be assumed that strut 60 is simply a little low. The main strut valve 192 is open and the hand pump 130 is actuated. Hydraulic fluid under pressure passes through check valve 140, line 114, valve 144 which is open, the distribution block 84 and line 97 having valve 192 therein. When the strut 60 is charged with hydraulic fluid the main strut valve 192 is left open and air is applied (Figure 7) into strut 60 by setting the regulator 79 and opening air valve 85. This admits air into distribution block 84 with the air flowing through the block 84 and the main strut hydraulic valve 192 and the same line 97 that formerly conducted the hydraulic fluid to the main strut. Figure 6 shows main strut 60 being charged only with hydraulic fluid while Figure 7 shows the second step which is the application of air under pressure into the strut above the fluid level. The strut 60 (Figure 7) is now pressurized with hydraulic fluid and air.

Figure 8:
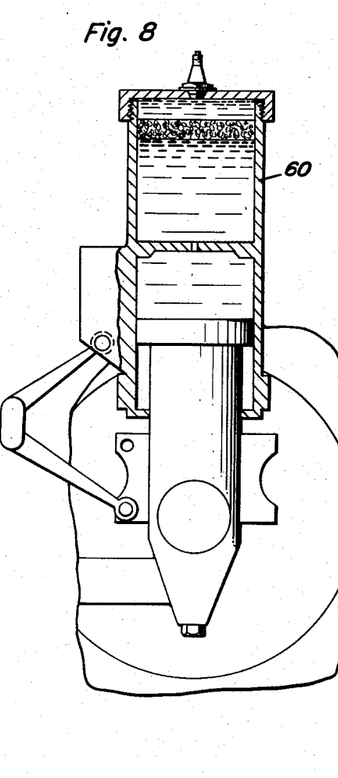
Figure 8 is a view similar to Figures 6 and 7 but showing the same strut in a further advanced stage of servicing.

Now, air valve 85 is closed and additional hydraulic fluid (Figure 8) is applied to the strut 60 through the main strut line 97. The Schrader valve on the strut 60 is now closed and the pressure is bled from the apparatus by opening valve 160 enabling the liquid and air under pressure in the apparatus or tool to return to tank 122.

Special attention is drawn to the next phase of the operation. When there is an unbalance between the left main strut 63 and the right main strut 60, bleed valves 166 and 196 are used. Assume that the right main strut 60 is slightly high (or the left main strut is slightly low). If the right main strut 60 is slightly high, bleed valve 196 is open to bleed off some air, noting that this air can and does return to the hydraulic pump tank 122. If the left main 63 were slightly high in accordance with factory specification, the bleed valve 166 would have been used to bleed some of the air off, instead of bleed valve 196.

In order to service a large airplane, such as the B-52 Globemaster, there are four mains 60, 61, 62 and 63 and two outriggers 64 and 65. In this case, the same procedure is followed for the mains, as described in connection with mains 60 and 63. This is accomplished by opening one of the main strut valves, for instance valve 182 and meanwhile all the other strut valves are closed. With this one main strut valve open, the hydraulic pressure is applied by operating the hand pump 130. Then air is applied to this strut under consideration to the same air line and air valve that was described in connection with the servicing of strut 60. In order to bleed this strut 61, the main bleed pressure valve 160 is open, and the full procedure for this main strut is followed as described in connection with strut 61. Each main strut is similarly serviced.

In order to service the outriggers 64 and 65, a slightly different procedure is necessary because the outriggers are near the wing tips and the full weight of the airplane should not be carried by them at any time. Therefore, it is assumed that the apparatus has all valves closed and the left outrigger strut 64 is slightly low. Both Schrader valves that is the Schrader valve for strut 64 and 65 are opened. Bleed line valve 164 is opened thereby draining the left outrigger strut 64 and allowing it to bottom out. Then bleeder valve 164 is closed and hydraulic fluid is injected to strut level by opening the hydraulic valve 144 and the outrigger valve 152. Then the regulator 79 is set to the desired pressure and the bleeder valve 164 is closed. The main air valve 85 is then opened, this conducting air under pressure through distribution block 84, a part of line 96, valve 152 and line 100. As the pressure enters the left outrigger, bleeder valve 180 which is for the right outrigger 65, is slowly opened. This will permit the right outrigger strut to bottom out because the airplane is being tilted down on the right and the left outrigger is being raised. Air valve 85 is then closed and bleeder valve 164 is closed with the outrigger strut valve 152 closed, and hydraulic fluid is injected by opening the hydraulic valve 144. This allows hydraulic fluid under pressure to pass through distribution block 84, through the outrigger valve 180 and into the strut 65. The strut is filled to strut level and the hydraulic valve 144 is then closed and the air valve 85 is opened allowing air to enter the distribution block 84 and pass through the outrigger bleeder valve 180 and into the right outrigger strut. It is to be noted well that as the air is entering the right outrigger strut, bleed valve 164 must be slowly cracked open allowing pressure from the left strut to be bled off in order to balance the left and right struts 64 and 65 to have a level airplane. As the left and right outrigger struts approach the correct tolerance, bleeder valve 164 is closed and the left outrigger valve 180 is opened immediately and quickly so that the same amount of air pressure, that is a balance between the left and right outrigger struts, will be applied. When the outrigger struts are balanced, the left outrigger valve 152 is closed and the right outrigger valve 180 is closed. The Schrader valves on struts 64 and 65 are closed tight, and pressure is bled from the apparatus by opening valve 160.

Safety valves 108 and 110 were said to be adjustable. Further, two types of airplanes have been discussed, the B-52 Globemaster having the six struts and a much simpler aircraft having only two struts. Valves 108 and 110 may be adjusted as a safety feature for the particular airplane being serviced. For example, for the Globemaster a 3000 p.s.i. setting may be required whereas, for other airplanes other pressure specifications will prevail.

Figures 1, 16, 17:
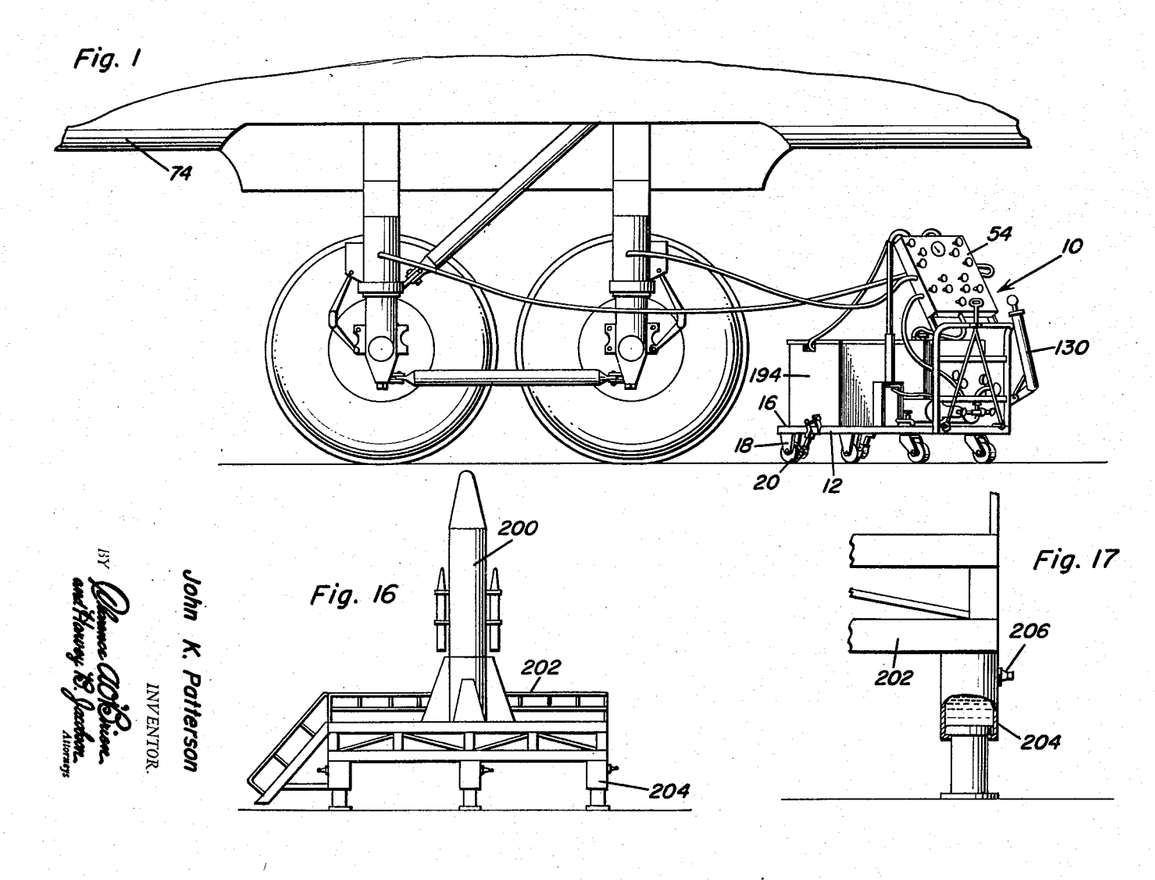

In Figures 16 and 17 there is a missile 200 shown on a launching pad 202. The launching pad is supported at least in part by a plurality of struts 204, each of which has a Schrader valve 206 by which apparatus 12 may be connected thereto. The purpose of Figures 16 and 17 is to pictorially represent the fact that the strut servicing apparatus is not restricted to the service of aircraft struts. It may be applied not only to a missile launching pad which uses hydraulic struts, ship landing docks also using hydraulic struts and any other application of hydraulic struts or equivalent hydraulic structures. Furthermore, only those parts and those devices on cart 12 which actually enter into the servicing of a strut have been described. Many additional features and devices could well be added and are actually present. For instance there is a convenient container 194 on the cart so that the necessary length of hoses may be maintained in an orderly condition. A fire extinguisher 195 is on a fire extinguisher rack on the cart. The rack is made in such a way that the tanks 67 and 68 may be easily slid from the base 16 of the cart so that they may be removed and replaced. It is not practicable to mention every environment within which the tool may be used. Suffice it to say that anywhere where there is need for servicing a hydraulic strut or equivalent device, the tool has an excellent application. Further, it is not practicable to list each and every possible attachment which may be applied to the cart, such as hand tool racks, which would aid in the convenience of operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for servicing a hydraulic strut, said apparatus comprising a source of air under pressure, a hydraulic supply, means including a pump connected with the hydraulic supply for drawing fluid under pressure therefrom, a distribution block having a passage and provided with a plurality of ports opening into said passage, a hydraulic valve connected with said means for drawing fluid under pressure and interposed between said pump and said distribution block, a pressure regulator connected with the air supply and with said distribution block, an air valve to control the regulated air supply into said block, a plurality of combination air and hydraulic fluid lines connected with said ports and adapted to connect with the struts that are to be serviced, and valves in said plurality of lines to control the passage of air and the passage of hydraulic fluid therethrough so that hydraulic fluid and air may be selectively applied to the struts by opening and closing said valves in coordination with the opening and closing of said air and hydraulic fluid valves respectively.

2. An apparatus for servicing a hydraulic strut, said apparatus comprising a source of air under pressure, a hydraulic supply, means including a pump connected with the hydraulic supply for drawing fluid under pressure therefrom, a distribution block having a passage and provided with a plurality of ports opening into said passage, a hydraulic valve connected with said means for drawing fluid under pressure and interposed between said pump and said distribution block, a pressure regulator connected with the air supply and with said distribution block, an air valve to control the regulated air supply into said block, a plurality of combination air and hydraulic fluid lines connected with said ports and adapted to connect with the struts that are to be serviced, valves in said plurality of lines to control the passage of air and the passage of hydraulic fluid therethrough so that hydraulic fluid and air may be selectively applied to the struts by opening and closing said valves in coordination with the opening and closing of said air and hydraulic fluid valves respectively, bleed lines connected with said plurality of lines and having bleed valves therein, a bleed line network of which said bleed lines constitute a part, and said network connected to said hydraulic supply.

3. An apparatus for servicing a hydraulic strut, said apparatus comprising a source of air under pressure, a hydraulic supply, means including a pump connected with the hydraulic supply for drawing fluid under pressure therefrom, a distribution block having a passage and provided with a plurality of ports opening into said passage, a hydraulic valve connected with said means for drawing fluid under pressure and interposed between said pump and said distribution block, a pressure regulator connected with the air supply and with said distribution block, an air valve to control the regulated air supply into said block, a plurality of combination air and hydraulic fluid lines connected with said ports and adapted to connect with the struts that are to be serviced, valves in said plurality of lines to control the passage of air and the passage of hydraulic fluid therethrough so that hydraulic fluid and air may be selectively applied to the struts by opening and closing said valves in coordination with the opening and closing of said air and hydraulic fluid valves respectively, bleed lines connected with said plurality of lines and having bleed valves therein, a bleed line network of which said bleed lines constitute a part, said network connected to said hydraulic supply, said distribution block having one of said ports constitute a main bleed port, and a main bleed valve associated with said main bleed port and one of the lines of said network to drain the distribution block and the other lines of hydraulic fluid and air.

4. The apparatus of claim 3 wherein the bleed line which is connected with said supply having a sight glass therein so that the fluid that is being returned may be visually inspected.

5. The apparatus of claim 3 wherein two of said ports of said distribution block have pressure opening adjustable safety valves therein so that they may be adjusted in accordance with the pressure specifications of the struts being serviced.

6. A strut servicing tool comprising a source of air under pressure, a source of hydraulic fluid, a pump connected with said hydraulic fluid source, a distribution block having a passageway provided with a plurality of ports that communicate therewith, an air pressure line extending from said air source to one of said ports, a main air valve in said air pressure line between said air source and said distribution block, a pressure regulator in said air pressure line and adjustable to a preselected pressure level, a main hydraulic line within which said pump is located and connected with said hydraulic source, a main hydraulic valve connected in said main hydraulic line, said main hydraulic line connected to one of said ports of said distribution block so that there is available in said distribution block both air and hydraulic fluid under pressure by manipulation of said hydraulic and said air valves, a first strut line and a second strut line connected respectively to a pair of said ports and adapted to be connected with hydraulic struts to charge the hydraulic struts with hydraulic fluid and then air and then again hydraulic fluid, strut valves in said strut line, a bleeder line network connected with both of said strut lines, bleeder valves in said bleeder network, and said bleeder network connected with said source for the return of both air and hydraulic fluid to said hydraulic source.

7. A strut servicing tool comprising a source of air under pressure, a source of hydraulic fluid, a pump connected with said hydraulic fluid source, a distribution block having a passageway provided with a plurality of ports that communicate therewith, an air pressure line extending from said air source to one of said ports, a main air valve in said air pressure line between said air source and said distribution block, a pressure regulator in air pressure line and adjustable to a preselected pressure level, a main hydraulic line within which said pump is located and connected with said hydraulic source, a main hydraulic valve connected in said main hydraulic line said main hydraulic line connected to one of said ports of said distribution block so that there is available in said distribution block both air and hydraulic fluid under pressure by manipulation of said hydraulic and said air valves, a first strut line and a second strut line connected respectively to a pair of said ports and adapted to be connected with hydraulic struts to charge the hydraulic struts with hydraulic fluid and then air and then again hydraulic fluid, strut valves in said strut line, a bleeder line network connected with both of said strut lines, bleeder valves in said bleeder network, said bleeder network connected with said source for the return of both air and hydraulic fluid to said hydraulic source, a second pair of strut lines connected with two additional ports in said block and having strut valves therein and operatively connected with said bleed line network, and additional bleed line valves in said network and connected between said second pair of strut lines and said network.

8. A strut servicing tool comprising a source of air under pressure, a source of hydraulic fluid, a pump connected with said hydraulic fluid source, a distribution block having a passageway provided with a plurality of ports that communicate therewith, an air pressure line extending from said air source to one of said ports, a main air valve in said air pressure line between said air source and said distribution block, a pressure regulator in said air pressure line and adjustable to a preselected pressure level, a main hydraulic line within which said pump is located and connected with said hydraulic source, a main hydraulic valve connected in said main hydraulic line, said main hydraulic line connected to one of said ports of said distribution block so that there is available in said distribution block both air and hydraulic fluid under pressure by manipulation of said hydraulic and said air valves, a first strut line and a second strut line connected respectively to a pair of said ports and adapted to be connected with hydraulic struts to charge the hydraulic struts with hydraulic fluid and then air and then again hydraulic fluid, strut valves in said strut line, a bleeder line network connected with both of said strut lines, bleeder valves in said bleeder network, said bleeder network connected with said source for the return of both air and hydraulic fluid to said hydraulic source, a second pair of strut lines connected with two additional ports in said block and having strut valves therein and operatively connected with said bleed line network, additional bleed line valves in said network and connected between said second pair of strut lines and said network, outrigger strut lines for the application of hydraulic fluid and air under pressure to outrigger struts, said outrigger strut lines connected to one of said pairs of strut lines and having outrigger strut valves therein, and bleed valves for the outriggers connected with said network and said network being connected with said strut lines for the return of and for the balancing of pressure in the struts.

9. The apparatus of claim 8 wherein there is a main bleed valve connected with another of said ports of said distribution block and connected with said network to drain the lines connected with said distribution block and the struts.

10. The apparatus of claim 6 wherein there is a main bleed valve connected with another of said parts of said distribution block and connected with said network to drain the lines connected with said distribution block and the struts.

11. A strut servicing tool comprising a source of air under pressure, a source of hydraulic fluid, a pump connected with said hydraulic fluid source, a distribution block having a passageway provided with a plurality of ports that communicate therewith, an air pressure line extending from said air source to one of said ports, a main air valve in said air pressure line between said air source and said distribution block, a pressure regulator in said air pressure line and adjustable to a preselected pressure level, a main hydraulic line within which said pump is located and connected with said hydraulic source, a main hydraulic valve connected in said main hydraulic line, said main hydraulic line connected to one of said ports of said distribution block so that there is available in said distribution block both air and hydraulic fluid under pressure by manipulation of said hydraulic and said air valves, a first strut line and a second strut line connected respectively to a pair of said ports and adapted to be connected with hydraulic struts to charge the hydraulic struts with hydraulic fluid and then air and then again hydraulic fluid, strut valves in said strut line, a bleeder line network connected with both of said strut lines, bleeder valves in said bleeder network, said bleeder network connected with said source for the return of both air and hydraulic fluid to said hydraulic source, a second pair of strut lines connected with two additional ports in said block and having strut valves therein and operatively connected with said bleed line network, additional bleed line valves in said network and connected between said second pair of strut lines and said said network, outrigger strut lines for the application of hydraulic fluid and air under pressure to outrigger struts, said outrigger strut lines connected to one of said pairs of strut lines and having outrigger strut valves therein, and bleed valves for the outriggers connected with said network and said network being connected with said strut lines for the return of and for the balancing of pressure in the struts, and an adjustable pressure operated valve connected with another of said ports of said distribution block and adapted to open when a present pressure level in said passage of said distribution valve is reached.

12. The apparatus of claim 8 wherein there is a second pressure regulator connected with said pressure source and adapted to service equipment requiring pressure higher than the pressure of said pressure line having the first mentioned air pressure regulator therein.

13. In strut servicing apparatus for struts, a portable cart, a source of air under pressure carried by said cart and having a main air pressure line, a pressure regulator in said main air pressure line, a distribution block with which said main air pressure line is connected, a main air pressure valve in said line and in advance of said block, said block having a passageway and a plurality of ports communicated with said passageway, said line connected with one of said ports, a source of hydraulic fluid under pressure carried by said cart and having a fluid pressure line connected with another of said ports, a hydraulic pressure valve in said hydraulic line and in advance of said distribution block, a check valve in said hydraulic pressure line, a plurality of strut lines connected with other of said ports, a bleed line network connected with said strut line, bleed valves in said bleed network, and single valves in each strut line to control the flow of air and fluid through said strut lines with said distribution block conducting both air and hydraulic fluid under pressure therethrough in accordance with the opening and closing of said main air valve and said main hydraulic fluid line valve respectively.

14. The apparatus of claim 13 wherein there are at least six of said strut lines which may be terminally connected with at least six struts for the servicing of a device having six struts.

15. In strut servicing apparatus for struts, a portable cart, a source of air under pressure carried by said cart and having a main air pressure line, a pressure regulator in said main air pressure line, a distribution block with which said main air pressure line is connected, a main air pressure valve in said line and in advance of said block, said block having a passageway and a pluraltiy of ports communicated with said passageway, said line connected with one of said ports, a source of hydraulic fluid under pressure carried by said cart and having a fluid pressure line connected with another of said ports, a hydraulic pressure valve in said hydraulic line and in advance of said distribution block, a check valve in said hydraulic pressure line, a plurality of strut lines connected with other of said ports, a bleed line network connected with said strut line, bleed valves in said bleed network, single valves in each strut line to control the flow of air and fluid through said strut lines with said distribution block conducting both air and hydraulic fluid under pressure therethrough in accordance with the opening and closing of said main air valve and said main hydraulic fluid line valve respectively, an auxiliary air pressure line having a second pressure regulator, and said auxiliary air line adapted to connect with apparatus having a higher specification requirement for air under pressure in order to service the same.

16. The apparatus of claim 13 wherein there are at least six of said strut lines which may be terminally connected with at least six struts for the servicing of a device having six struts, said pressure source for hydraulic fluid including a tank, a fluid delivery line connected to the tank and having at least one filter therein, a pump in said fluid delivery line, and said fluid delivery line operatively connected with said hydraulic fluid pressure line.

17. The apparatus of claim 16 wherein there is an adjustable pressure valve connected with the distribution block so that the air and fluid under pressure in said block may be governed in accordance with the struts being serviced.

18. The apparatus of claim 14 wherein there are low pressure relief valves in said network at the juncture of said network with two of said strut lines.

No references cited.